Sept. 23, 1969     H. N. GRILLOT     3,468,575
KNOTTER AND JAW
Filed Sept. 26, 1967     2 Sheets-Sheet 1
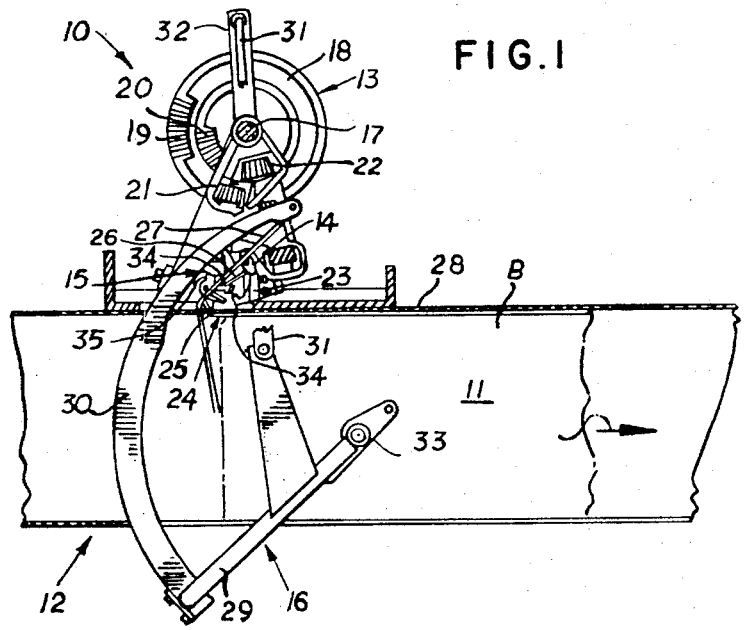
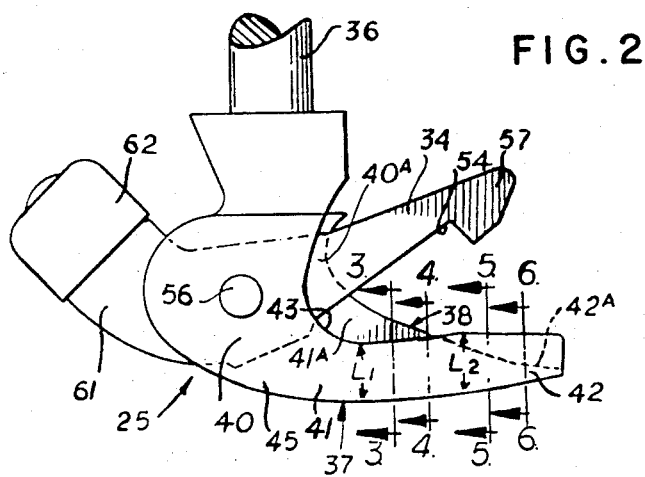
INVENTOR
HOMER N. GRILLOT
ATTY

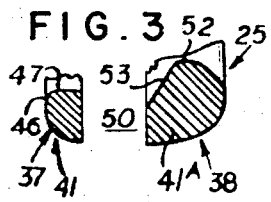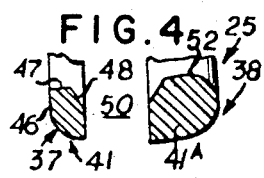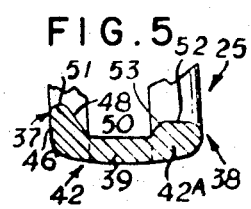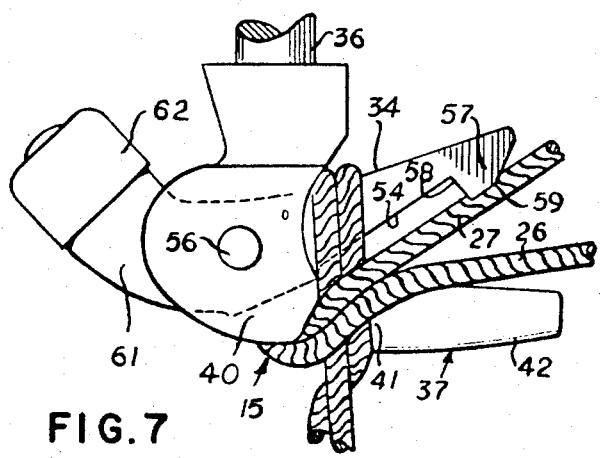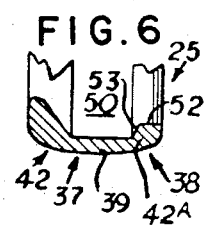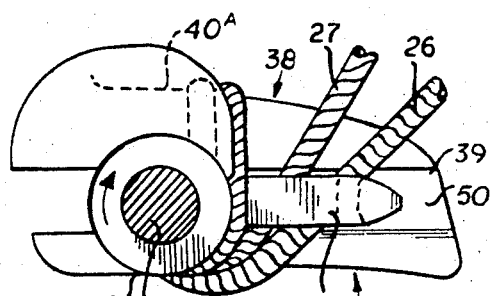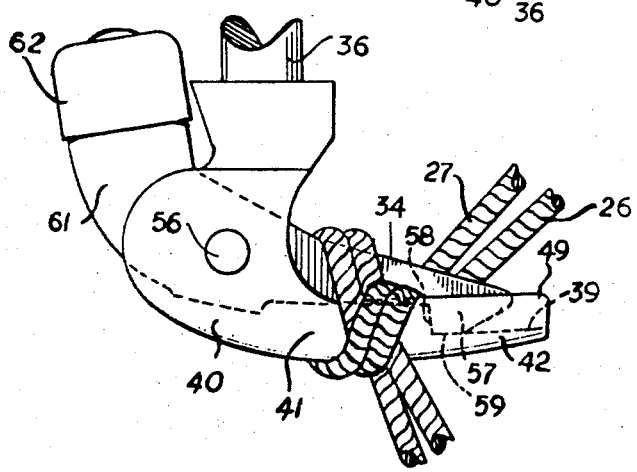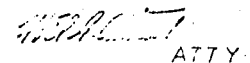

United States Patent Office 3,468,575
Patented Sept. 23, 1969

3,468,575
KNOTTER AND JAW
Homer N. Grillot, Naperville, Ill., assignor to International Harvester Company, Chicago, Ill., a corporation of Delaware
Filed Sept. 26, 1967, Ser. No. 670,530
Int. Cl. B65h 69/04
U.S. Cl. 289—11                                           8 Claims

ABSTRACT OF THE DISCLOSURE

A rotary hook for use in a knotting mechanism and having a leading and a trailing shoulder defining a groove therebetween. The groove is positioned to receive a jaw pivotally mounted on the hook and movable with respect to the groove between an open position for receiving twine, and a closed position for gripping the twine and crimping it into the groove. The leading shoulder is particularly contoured to prevent premature rendering of twine received by the hook with the jaw in the open position.

Background and summary of the invention

This invention relates generally to baler knotters and more specifically to hooks for use in baler knotters.

Knotters of the general type considered herein have long been used on balers to bind bales into self-sustaining bundles. Over the years, research and development in the art has produced a knotter capable of performing at near perfect efficiencies. However, this performance has been obtained where only one type of twine has been used as the baling medium. It has been found that while a knotter may perform satisfactorily with a given type of twine, e.g. sisal, the same knotter perform poorly with another type of twine, e.g. polypropylene. This of course means that the baler operator does not have a wide choice of twines but is restricted to the type for which the knotter was designed.

The general purpose of the present invention is therefore to provide a knotter capable of using a variety of twines with equal facility.

The principal part of a knotter is the knotter hook, the other components (twine holder, needle, and knife) being operative as an incident to the operation of the hook.

The knotter hook must be designed to provide three functions: (1) form a loop in a pair of strands, (2) grip the strand ends, and (3) permit the loop to be stripped over the gripped ends completing the knot. Conventionally, the knotter hook is formed with a shank, tapered throat and toe portions, and a jaw, all of which give the hook the proper characteristics to perform its assigned functions.

The present invention is directed at the configuration of the throat and toe portions. In the past, the throat portion and toe portion have been contoured to facilitate stripping of the strand loop over the gripped end. This proved satisfactory for sisal twines having a tensile strength of 325 pounds or less. With stronger sisal twines and for polypropylene twines it has been found that the loops in the area of the throat portion renders prematurely in the direction of the toe portion causing the knotter to miss.

It is therefore an important object of the present invention to provide a knotter hook particularly contoured to minimize the tendency of loops to render prematurely.

Another object is to provide a knotter hook having a throat portion contoured to retain gripped strands in the proper orientation.

A further object is to provide a knotter hook with an increased opening for receiving twine preliminary to the gripping phase of the tieing cycle.

A still further object is to provide a knotter hook particularly configurated to facilitate the stripping action of the knot therefrom.

These and other objects will become apparent to those skilled in the art from the following disclosure taken in conjunction with the attached drawings.

Drawings

FIGURE 1 is a side elevational view showing the knotter mechanism mounted on a baler;

FIGURE 2 is an enlarged fragmentary view of the knotter hook used in the mechanism shown in FIGURE 1;

FIGURES 3-6 are sectional views taken at various locations on the knotter hook shown in FIGURE 2, the locations being indicated by numbers corresponding to the figure designations.

FIGURE 7 is another view of a knotter hook at one step in the tieing cycle;

FIGURE 8 is a plan view of the knotter hook shown in FIGURE 7; and

FIGURE 9 is another view of the knotter hook at a subsequent step in the tieing cycle.

Description of the preferred embodiment

The knotter mechanisms will first be described generally to indicate the environment for the novel hook contemplated in this invention, and then the hook will be described in detail.

With reference to FIGURE 1, a knotter mechanism 10 is shown mounted above a baling chamber 11 of a conventional baler designated generally as 12. It should be pointed out that knotting mechanisms of the type described are mounted in pairs on the bale chamber 11, but for purposes of illustration only one will be described herein.

The knotter mechanism 10 may be considered as having drive parts 13, a cord holder assembly 14, a hook assembly 15, and a needle assembly 16.

The drive parts interconnect a knotter shaft 17 to the baler main drive gear case (not shown) through conventional means and provide the means for driving the knotter mechanism 10 in timed relation to reciprocations of the baler plunger (not shown). The drive shaft 17 is keyed to a knotter cam disk 18 provided with segmental gears 19 and 20 which respectively are aligned to engage a billhook pinion 21 and a disk holder gear 22. The pinion 21 and gear 22, respectively, actuate the knotter hook assembly 15 and the cord holder assembly 14. The cord holder assembly 14 functions in combination with a breastplate finger 24 to position opposite ends 26 and 27 of a strand 28 encircling a bale B formed in the baling chamber 11. When the bale is completed, the strand carrying needle assembly 16 delivers strand end 27 to the cord holder assembly 14. The needle assembly 16 includes an arcuate needle arm 30, a needle tie pipe 29, a needle pitman and yoke 31, and a needle crank 32. The crank 32 is rotated by the knotter shaft 17 and through the yoke 31, and tie pipe 29 pivots the needle arm 30 about pivot point designated as 33. The needle arm 30 delivers strand end 27 to the knotting mechanism 10. Strand end 27 is laid across the breastplate finger 24 beside strand end 26 and is placed in the cord holder assembly 14. The strand ends 26 and 27 are thusly positioned in the path of rotation of a hook 25 of the hook assembly 15. Thus, it will be appreciated that revolvement of the shaft 17 one revolution actuates the hook assembly 15, the knotter assembly 14, and the needle assembly 16 through one tieing cycle according to a definite sequence.

Briefly, the tieing operation is as follows:

The rotating hook 25 first engages the strands 26 and 27 positioned between the breastplate finger 24 and the cord holder assembly 14 sweeping the strands from the breastplate finger 24 and wrapping a loop around a portion of the hook 25. As the hook 25 returns to its home position, a jaw 34 actuated by a cam 35 opens and receives the ends 26 and 27. The contour of a cam 35 then causes the jaw 34 to return to a closed position gripping the ends 26 and 27 securely on the hook 25. In the meantime, the holder assembly 14 has released the held end 26 and has forced the end 27 past a knife 23 which severs the end 27 from a twine supply. Now as the bale B is forced from the bale chamber 11 by the formation of a subsequent bale, the loop portion is first stripped over the jaw 34 and then the held portion is pulled free from the jaw 34 completing the knot. A more detailed description of the tieing cycle is presented in U.S. Patent 3,101,963 issued to H. D. Sullivan et al.

With reference to FIGURES 2-9, details of the hook assembly 15 will now be described. The knotter hook 25 is attached to the lower end of a shaft 36 which is driven by the pinion 21 (see FIGURE 1). As best seen in FIGURE 8, the hook 25 includes a leading shoulder 37 and a trailing shoulder 38, with reference to direction of rotation of shaft 36 as indicated by the arrow. The leading and trailing shoulders 37 and 38 define an elongate groove 50 positioned to receive the jaw 34. The jaw 34, hinged to the shank portion by pin 56 is movable between a closed position (FIGURE 9) and an open position (FIGURE 7). The outer ends of the leading and trailing shoulders 37 and 38 are interconnected by a section 39. As shown in FIGURE 2, the leading shoulder 37 comprises a shank portion 40, a throat portion 41 extending laterally from the shank portion 40, and a toe portion 42 extending outwardly from the throat portion 41. Likewise, the trailing shoulder includes a shank portion 40a, a throat portion 41a and a toe portion 42a. Referring specifically to the leading shoulder 37, the junction of the throat portion 41 to the shank portion 40 is formed with a concavity 43 on the inner side, and a smooth shoulder 45 on the outer side; and the junction of the toe portion 42 to the throat portion 41 is smoothly contoured. As best seen in FIGURE 9, the toe portion 42 has a distal end 49 positioned outwardly of the jaw 34 with the jaw 34 in the closed position. Now as shown in the cross sectional figures (FIGURES 3-6) the throat portion 41 has a leading surface 46 and a top surface 47 and includes a chamfered portion 48 flanking groove 50. The toe portion 42 similarly has a side portion 46, a rounded top portion 51, and a chamfered portion 48. As indicated in the sectional views, the surfaces are smoothly contoured from the shank portion 40 to the distal end 49. The contour of the trailing shoulder 38 is designed to facilitate the stripping action, its throat portion 41a and toe portion 42a tapering continuously from shank to toe. The trailing shoulder 38 is also formed with a top surface 52 and a chamfered inner surface 53 flanking the groove 50. As indicated in FIGURE 2, the profile of the trailing shoulder 38 differs markedly from that of the leading shoulder 37. The profile dimension of the throat portion 41a is generally greater than the corresponding dimension of throat portion 41; whereas the profile dimension of toe portion 42a is smaller than the corresponding dimension of toe portion 42.

The minimum profile dimension of the leading shoulder indicated by the letter $1_1$ in FIGURE 2 is located adjacent the junction of the throat portion 41 and the shank portion 40, and the maximum profile dimension of the throat portion 41 indicated by the letter $1_2$ is located at the junction of the throat portion 41 and the toe portion 42. Thus, $1_2$ being greater than $1_1$, it follows that the leading surface 46 corresponding to the location $1_1$ is greater than the leading surface 46 corresponding to the location indicated by the letter $1_2$.

The jaw 34 interposed between the shank portions 40 and 40a, extend outwardly in the direction of the leading and trailing shoulders 37 and 38, and is pivotable about pin 56 into and out of the groove 50. The jaw 34 includes a lower chisal edge 54 adapted to fit into groove 50, and a downwardly projecting portion 57 adapted to fit between the toe portions 42 and 42a. The projection 57 includes a flat portion 59, adapted to engage the section 39, and a shoulder portion 58 adapted to trap twine in groove 50 with the jaw 34 in the closed position. The jaw 34 also includes a heel 61 which carries a roller 62. Upon revolvement of hook assembly 25, the roller 62 follows the cam 35 which is particularly contoured to cause the jaw 34 to move between the closed and open positions. The jaw 34 functions to hold strand portions 26, 27 while the looped portion is stripped thereover completing the overhand knot. The holding ability of the jaw results from the projection 57 closing the groove 50 and the frictional engagement of the strands 26 and 27 between the projection 57 and the chamfered edge 53 of the trailing shoulders. If the surface 53 engages an excessive portion of the strands 26, 27 the increase in friction causes the strands to jam. On the other hand, too small of a surface 53 causes the knotter to miss meaning that the knot was not satisfactorily tied. It has been found that a trailing shoulder 38 having a height of about one strand diameter in the area of the toe portion 42a provides a chamfered surface 53 which presents the proper amount of resistance to the passage of twine thereover. During the stripping action, the strands 26, 27 trapped in the groove 50 by the projection 57, after the loop has cleared the jaw 34, are pulled against the shoulder portion 58, the strands 26, 27 each engaging the portion 58 in a side-by-side relation. Thus, only the lower of the strands 26, 27 engages the projection 57 and the chamfered surface 53. This engagement presents sufficient resistance to prevent a miss and yet avoids jamming.

Now with reference to FIGURES 7, 8 and 9 the operation of the knotter hook assembly 25 will be described, it being understood that the other components of the knotter mechanism 10 functions as previously described. As shown in FIGURE 7, the hook 25 has revolved almost one revolution wrapping portions of ends 26 and 27 around the shanks 40 and 40a, thereby forming a loop in each of the strand ends 26 and 27. Note that a portion of each loop is disposed above the jaw 34. The roller 62 following the cam 35 (see FIGURE 1) now forces the jaw 34 to the open position for receiving strands 26 and 27. The particular configuration of the leading shoulder 37 and jaw 34 permits the strands 26 and 27 to be placed deep within the mouth defined by the jaw 34 and shoulders 37 and 38 well removed from the projection 57. Because of the increase in contact surface 46 (see FIGURES 3-6) from the concavity 43 to the junction of the throat portion 41 and the toe portion 42, the tendency of the loops to render in the direction of the projection 57 is minimized. Now as the cam 35 moves the roller 62 to close the jaw 34, the strands 26 and 27 are clamped between the chisel edge 54 and the chamfered portions 48 and 53 of the leading and trailing shoulders 37 and 38. In this position, the chisel edge 54 extends generally parallel to the surface 47 of the throat portion 41, and the flat surface 59 of the jaw 34 seats on section 39. This places the strands 26 and 27 in a position for stripping the loops over the held portions thereby completing the knot. This occurs as a subsequent bail is formed in the bailing chamber 11, as previously described.

What is claimed is:

1. An assembly for tieing together a pair of strands, said assembly including a rotary bill hook having a leading shoulder, a trailing shoulder, and a groove separating said shoulders; a jaw having a lower edge and adapted to move with respect to said said groove between an open position, for receiving said strands between said lower edge and said shoulders, and a closed position for gripping said received strands between said lower edge and said shoulders, the improvement wherein said leading shoulder comprises:

a shank portion, a throat portion extending laterally from said shank portion, and a toe portion extending outwardly from said throat portion, said throat portion including a top surface extending generally parallel to said lower edge of said jaw in said closed position.

2. An assembly for tieing together a pair of strands, said assembly including a bifurcated hook having leading and trailing shoulders defining a groove therebetween, and a jaw movable relative to said groove between an open position for receiving said strands and a closed position for gripping said strands, the improvement wherein said leading shoulder comprises:

a shank portion, a throat portion extending laterally from said shank portion and having a surface for receiving strands thereon, a toe portion extending outwardly from said throat portion and cooperatively arranged with said jaw for retaining received strands on said receiving surface, said throat portion presenting a raised portion radially outwardly of said receiving surface, said raised portion being aligned with said receiving surface to aid in retaining received strands thereon.

3. An assembly as recited in claim 2 wherein said jaw includes a hook portion positioned to close said groove adjacent said toe portion with said jaw in said closed position, said raised portion of said throat portion being positioned adjacent said hook portion.

4. An assembly as recited in claim 2 wherein said throat portion is formed having a minimum cross sectional area adjacent said shank portion thereby presenting a minimum contact area for said received twine, and having a maximum cross sectional area adjacent said toe portion thereby presenting a maximum contact area for said received twine, whereby said received strands move from said minimum contact area to said maximum contact area as said knot is stripped from said assembly.

5. An assembly as recited in claim 4 wherein said toe portion is formed having a maximum cross sectional area adjacent said throat portion thereby presenting a maximum contact area for said received strands, and a minimum cross sectional area at its outer end thereby presenting a minimum contact area for said received strands whereby said received strands first pass over an increasing contact surface and then over a decreasing contact surface.

6. A knotter hook for tieing a knot in a pair of strands, said knotter hook comprising:

a leading shoulder;

a trailing shoulder extending generally parallel to said leading shoulder, said shoulders defining a groove therebetween;

a jaw movable into and out of said groove and adapted to cooperate with said shoulders to receive and grip said strands, said leading and trailing shoulders each having a shank portion, a throat portion projecting laterally from said shank portion, and a toe portion extending outwardly from said throat portion, said throat portion of said trailing shoulder having a profile thickness greater than the corresponding profile thickness of said leading shoulder, and said toe portion of said trailing shoulder having a minimum profile thickness less than that of said leading shoulder.

7. A knotter hook as recited in claim 6 wherein said toe portion of said trailing shoulder includes an inwardly facing surface cooperable with said jaw for retaining a strand therebetween, said surface being adapted to engage only one of said strands whereby said engagement presents resistance to movement of said engaged strand past said jaw.

8. A knotter hook as recited in claim 7 wherein said inwardly facing surface is particularly sized to present a width not to exceed one strand diameter.

References Cited

UNITED STATES PATENTS

| 3,101,963 | 8/1963 | Sullivan et al. | 289—2 X |
| 3,301,583 | 1/1967 | Grichnik | 289—11 |

FOREIGN PATENTS 966,268   10/1950   France.

LOUIS K. RIMRODT, Primary Examiner